(12) United States Patent
Brett et al.

(10) Patent No.: US 6,870,572 B1
(45) Date of Patent: Mar. 22, 2005

(54) METHOD AND CIRCUIT FOR PICTURE-IN-PICTURE SUPERIMPOSITION

(75) Inventors: Maik Brett, München (DE); Marko Hahn, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/914,686

(22) PCT Filed: Mar. 3, 2000

(86) PCT No.: PCT/DE00/00681

§ 371 (c)(1),
(2), (4) Date: Dec. 3, 2001

(87) PCT Pub. No.: WO00/52931

PCT Pub. Date: Sep. 8, 2000

(30) Foreign Application Priority Data

Mar. 4, 1999 (DE) .......................................... 199 09 562

(51) Int. Cl.[7] .............................................. H04N 5/445
(52) U.S. Cl. ...................... 348/567; 348/511; 348/718
(58) Field of Search ................................ 348/565–567, 348/714, 515, 512, 588, 511, 521, 716, 718; 345/788, 803

(56) References Cited

U.S. PATENT DOCUMENTS

| | | | | |
|---|---|---|---|---|
| 4,249,213 A | * | 2/1981 | Imaide et al. ................ | 348/565 |
| 4,821,086 A | * | 4/1989 | McNeely et al. ........... | 348/566 |
| 5,369,442 A | * | 11/1994 | Braun ......................... | 348/567 |
| 5,434,625 A | * | 7/1995 | Willis .......................... | 348/564 |
| 5,726,715 A | | 3/1998 | Endress | |
| 5,914,757 A | * | 6/1999 | Dean et al. .................. | 348/584 |
| 6,160,590 A | * | 12/2000 | Shimizu et al. ............. | 348/581 |

FOREIGN PATENT DOCUMENTS

| | | |
|---|---|---|
| EP | 0 304 236 | 2/1989 |
| EP | 0 411 548 | 2/1991 |
| EP | 0 471 878 | 2/1992 |
| EP | 0 739 130 | 10/1996 |
| WO | WO 00/18115 | 3/2000 |

OTHER PUBLICATIONS

English Translation of PCT International Preliminary Examination Report, dated Mar. 7, 2001, 8 pgs.
Masuda et al., "Picture in Picture System with a Digital Memory for VCRs", IEEE Transactions on Consumer Electronics, vol. CE–33, No. 3, Aug. 1987, pp. 230–238.

* cited by examiner

Primary Examiner—Victor R. Kostak
(74) Attorney, Agent, or Firm—Edwards & Angell, LLP; Peter F. Corless; George W. Hartnell, III

(57) ABSTRACT

A method for picture-in-picture insertion is described, which is distinguished in particular by the fact that
  the inset pictures are written to a memory device (2) in a circulating manner under continuously incremented write addresses,
  the first and last address of each written-in inset picture is stored,
  an overtake signal is formed by comparing the instantaneous address with the previously stored address, said signal indicating whether a previous address has been reached again and, consequently, the corresponding picture content has been overwritten,
  by evaluation of the overtake signal, the current or preceding segment is selected for read-out depending on whether or not overtaking took place before the start of the read-out, and
  the inset picture stored in the selected segment is read out with continuously incremented read addresses and is inserted into the main picture. A corresponding circuit arrangement is also described.

10 Claims, 5 Drawing Sheets

METHOD AND CIRCUIT FOR PICTURE-IN-PICTURE SUPERIMPOSITION

BACKGROUND OF THE INVENTION

1. Field of the Invention

The invention relates to a method for picture-in-picture insertion, in which a sequence of decimated inset pictures is written to a memory with at least two segments and is read out for insertion into a sequence of main pictures, to be precise in accordance with the preamble of claim 1, and also a circuit arrangement for picture-in-picture insertion, in particular for carrying out said method in accordance with the preamble of claim 6.

2. Background Art

Various methods and apparatuses for inserting one or more inset pictures into a main picture (PIP—Picture In Picture) are known. In this case, the inset pictures stored in the memory are read out synchronously with a main picture. Since the read-out speed is generally higher, in a manner corresponding to the decimation of the inset picture, than the write-in speed, a seam can occur in the inset picture on account of the write pointer being overtaken by the read pointer, since the inset picture is then composed of a current part and a preceding part.

In particular in the case where the two parts originate from different motion phases, a disturbing effect is produced since moving objects through which the seam passes are displayed in a distorted manner. Moreover, if the frequencies of the inset and main pictures do not correspond exactly, the seam drifts, which is perceived as particularly unpleasant.

EP 0 739 130 A2 discloses, for the purpose of avoiding this problem, storing two inset pictures (or fields in each case) in the memory device, so that it is always the case that exactly one picture can be read out while the next picture is written. Although this prevents the write pointer from being overtaken by the read pointer, there is nonetheless a significant disadvantage in that the storage capacity must be very high, which is associated with considerable costs.

BRIEF SUMMARY OF THE INVENTION

The invention is based on the object, therefore, of providing a method and also a circuit arrangement for picture-in-picture insertion of the type mentioned in the introduction by means of which, with relatively low outlay, an inset picture can be generated without a seam.

This object is achieved by means of a method which is distinguished by the fact that:

- the inset pictures are written to the memory device in a circulating manner under continuously incremented write addresses,
- the first address of each written-in inset picture is stored,
- an overtake signal is formed by comparing the instantaneous address with a previously stored address, said signal indicating whether a previous address has been reached again and, consequently, the corresponding picture content has been overwritten,
- by evaluation of the overtake signal, the current or preceding segment is selected for read-out depending on whether or not overtaking took place before the start of the read-out, and
- the inset picture stored in the selected segment is read out with continuously incremented read addresses and is inserted into the main picture.

The object is furthermore achieved by means of a circuit arrangement for inserting a sequence of decimated inset pictures into a sequence of main pictures, which has a memory device having at least two segments for the inset pictures, a write controller and a read controller and which is distinguished in particular by the fact that an overtake signal that can be fed into a display controller can be generated by the write controller, in that a segment buffer is provided, which segment buffer is connected to the read controller and serves to store a first and a last address of an inset picture, and in that a memory segment to be read out by the read controller can be selected by means of the display controller in a manner dependent on the overtake signal.

The solutions according to the invention are based on the insight that the write pointer can be prevented from being overtaken by the read pointer through suitable circulating addressing of the memory device in a manner utilizing the speed difference between the pointers. A significant advantage of this solution is that this holds true even when the size of the inset picture changes. Furthermore, is also not necessary to provide completely separate memory areas for reading and writing or to adapt the organization of the memory to the inset-picture size.

The subclaims contain advantageous developments of the invention.

Accordingly, for example, the write and read addresses are continuously incremented from a first memory address up to a last memory address and are in each case reset to the first memory address again after the last memory address has been reached.

For this purpose, in the circuit arrangement according to the invention, it is preferably provided that the write controller and the read controller each have an address counter for incrementing the write addresses and read addresses, respectively.

BRIEF DESCRIPTION OF THE DRAWINGS

Further details, features and advantages of the invention emerge from the following description of preferred embodiments with reference to the drawings, in which.

DETAILED DESCRIPTION OF THE INVENTION AND PREFERRED EMBODIMENTS THEREOF

Figure 1:
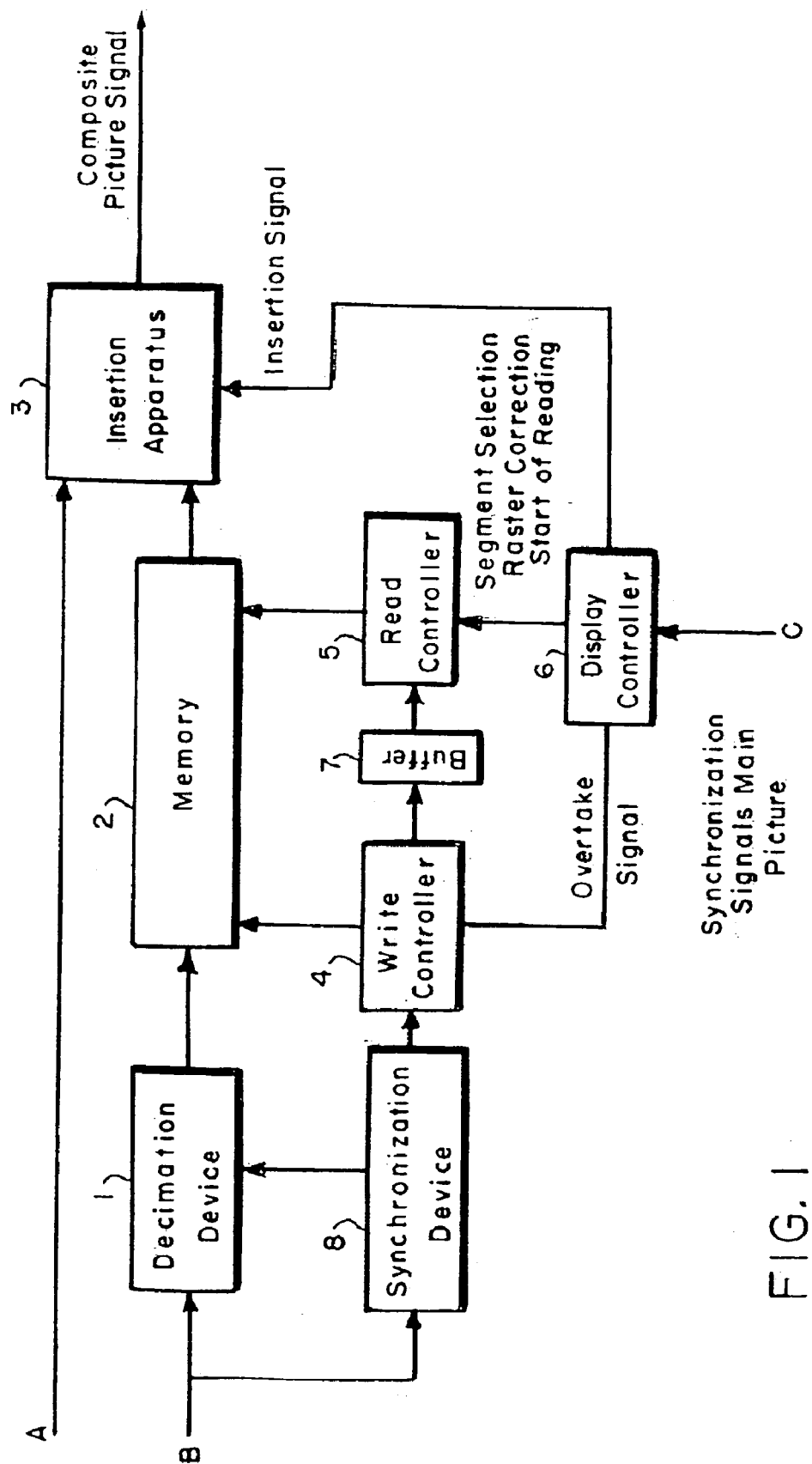
FIG. 1 shows a block diagram of a circuit arrangement according to the invention.

In accordance with FIG. 1, a main picture signal is fed to a circuit arrangement according to the invention via a first input A, and an inset picture signal is fed via a second input B. The inset picture signal passes to a decimation device 1 and also to a synchronization device 8. The picture signal of the inset picture, which is generally vertically decimated, is buffer-stored in the form of fields in a memory 2 and, after read-out, is fed together with the main picture signal to an insertion apparatus 3, which generates a composite picture signal.

The synchronization device 8 is connected to the decimation device 1 via a first output and to a write controller 4 via a second output. A first output of the write controller 4 is connected to the memory 2, while a second output is connected to a segment buffer 7 and a third output is connected to a display controller 6. The output of the segment buffer 7 is connected to a read controller 5, to which a first output of the display controller 6 is also fed. An output of the read controller 5 is connected to the memory 2. Finally, a second output of the display controller is fed to the insertion apparatus 3, the display controller having an input C for synchronization signals of the main picture.

In order to write to the memory 2 an inset picture signal that has been decimated by the decimation device 1, the write controller 4 generates the required addresses. In the simplest case, given an e.g. linear organization of the memory 2, the write address pointer is incremented after each write operation. If the address pointer reaches the last address, it is reset to the first address, under which the writing process is continued, this being done over the duration of the field with interruptions in accordance with the decimation. In this case, a preceding picture (field) is inevitably overwritten.

With each beginning of a new field, the first write address is stored in the segment buffer 7, which additionally stores the last address as well. Furthermore, the field position and size are also stored in the form of lines and pixels per line in the segment buffer 7, the data respectively stored last not being overwritten. The storage capacity of the segment buffer 7 is thus about double said data to be stored for a field, which in each case corresponds to a field in an instantaneous segment and a current segment in the memory 2.

Each time the write pointer is incremented, the write controller 4 additionally checks whether the new address has a specific offset, with respect to the previously stored (not with respect to the currently stored) address. This offset may also be zero in the case of a high vertical decimation factor. It serves essentially as a safety margin in order to avoid overtaking as a result of asynchronous data acceptance or slightly deviating vertical frequencies. With this offset, an overtake signal is generated which indicates whether the address has been reached again and hence this picture content has been overwritten.

The content of the segment buffer 7 is transferred to the read controller 5, by means of which the memory 2 is read beginning at one of the two addresses present after the start of reading at the insertion position, so that the inset picture can be generated in accordance with its position and size in the main picture by the insertion apparatus 3.

On the basis of the overtake signal transmitted by the write controller 4, the display controller 6 decides which of the two segments present in the memory 2 is read out. The selection of the segment initially always proceeds from the last segment. If overtaking took place before the start of reading, then the instantaneous (current) segment is read out. A corresponding segment selection signal is transmitted to the read controller 5.

The insertion position is also calculated by means of the display controller. The display controller 6 furthermore serves for correcting the raster positions, this being effected by comparison between the raster position of a displayed picture and the raster position of a stored picture and skipping or repetition of a line. Finally, the display controller 6 can also be utilized for multi-picture insertion.

Before the algorithm is described in detail, firstly the terms used in this context will be explained.

As was explained above, the decimated pixels of the inset picture are firstly stored in the memory 2. For display purposes, they are read from the memory again in the temporal framework of the main picture. For this purpose, the write and read addresses have to be generated by separate address counters.

Figure 2:
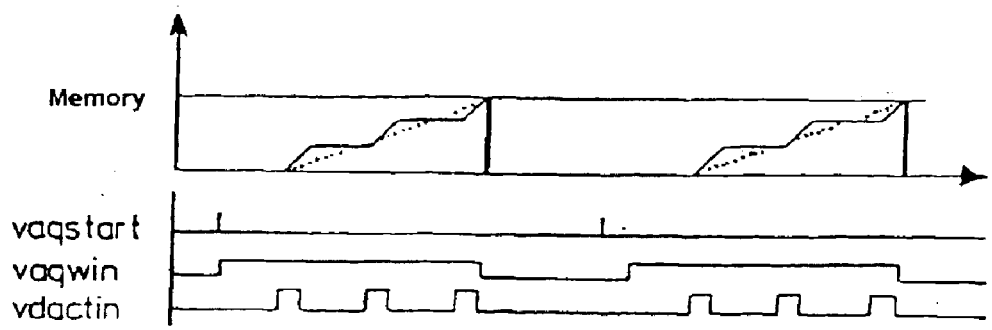
FIG. 2 shows a diagram of the signal profiles when writing to a picture memory.

FIG. 2 shows the corresponding signal profiles when writing to the memory 2. The instantaneous value of the write address counter represents a write pointer with a decimated inset pixel in the memory 2. The terms "write pointer" and "read pointer" shall be used for this reason.

An acquisition window (vaqwin) begins with a pulse (vaqstart), and the write address pointer rises with each decimated pixel. Since only the visible part of the inset picture is decimated, the write address pointer rests whenever there is no valid line available from the vertical decimation stage. After the last line to be decimated, the pointer is reset to the start position. The picture of a ramp with shoulders results in the representation.

Figure 3:
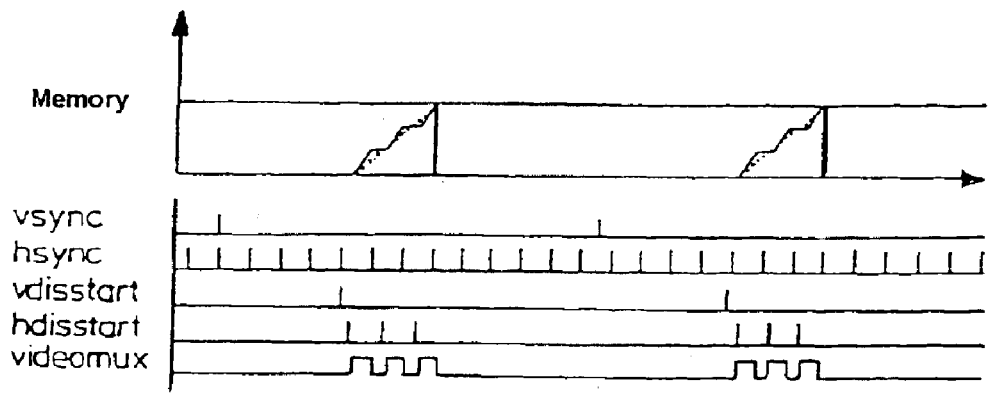
FIG. 3 shows a diagram of the signal profiles when reading from a picture memory.

FIG. 3 shows the corresponding signal profiles when reading from the memory 2. The instant at which a start signal (vdisstart) must be generated in order to begin reading from the memory 2 is calculated by means of the display controller 6 on the basis of the desired insertion position of the decimated inset picture in the main picture. With each line of the main picture, at the corresponding insertion position (hdisstart), a line of the decimated inset picture is then read from the memory and inserted into the main picture (video mux).

The picture of a ramp with shoulders once again results in the representation of the read address pointer. The ramps of the read and write address pointers differ in respect of their average gradient. The latter will be considered in detail below since it represents the rate at which a number of memory cells are swept over within a specific period of time.

The speed of the write address pointer changes with the decimation factor, to be precise in such a way that the ramp of the write address pointer becomes less steep as the decimation factor rises.

Figure 4:
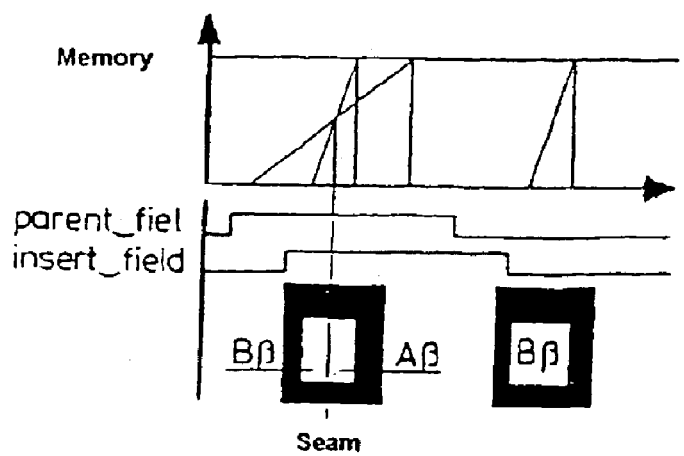
FIG. 4 shows a representation for illustrating the origination of a seam.

FIG. 4 shows the origination of a seam for the case of representation in the frame mode. If only a field memory is present and the inset picture has been decimated, the write pointer is generally overtaken by the read pointer. Since the sources for the inset picture ("insert_field") and the main picture ("parent_field") are generally asynchronous with respect to one another, a seam is thus produced. In FIG. 4, this is indicated by the point of intersection between the relatively slow write pointer and the read pointer that overtakes the latter, the upper-case letters A, B designating the raster position of the inset picture and the lower-case Greek letters α, β designating the raster position of the main picture.

From a temporal standpoint, the current field is read before the seam, while part of an older picture is reproduced after the seam. It should be noted in this case that, as a result of the line interlacing method (interlaced mode), the raster position changes in the event of overtaking, and this subsequently has to be corrected again.

The seam becomes very clearly visible in particular when a moving picture is displayed, that is to say when the current picture and the older picture contain different motion phases. If different standards are used for the main picture and the inset picture, then rolling of the seam occurs. As a result of different frame frequencies, the combination of the raster positions at the beginning of the representation changes a number of times every second. It is a very complicated procedure to perform a correction in a manner dependent on this incorrect position. Moreover, the picture can be very erratic in the vertical direction and be perceived as unpleasant.

The method according to the invention and the circuit arrangement according to the invention now allow, in particular in the frame mode, a seamless representation of pictures that have been decimated to different extents, without two separate field memories having to be available.

For the explanations below, it will be assumed that orthogonal memory division has been chosen. As a result, the memory is divided into lines with fixed start addresses. The length of such a line in the memory is determined by the largest picture.

Furthermore, it will be assumed that the inset picture and the main picture are present in the same standard. The two picture sources can be asynchronous but, in terms of their time frame, should initially have no deviations from one another. If the inset picture is not decimated vertically and horizontally, one field memory suffices for generating a seamless picture-in-picture representation, since the two address pointers cannot overtake one another on account of their identical speed. The case of raster position correction forms an exception. This correction is performed in the first line given a corresponding combination of main and inset picture positions.

In this case, the read address pointer jumps by one line. In the course of this jump, the situation where the write address pointer is overtaken must be prevented. This is achieved in that there is space for two additional lines in the memory.

Furthermore, suitable control of the memory accesses is necessary. The memory is written to with the fields in a circulating manner. As a result, with each new field, the start address is shifted by the number of additionally present lines in the direction of lower physical addresses. If the physical end address of the memory is reached in the course of writing, then a jump is made back to the start address.

Figure 5A:
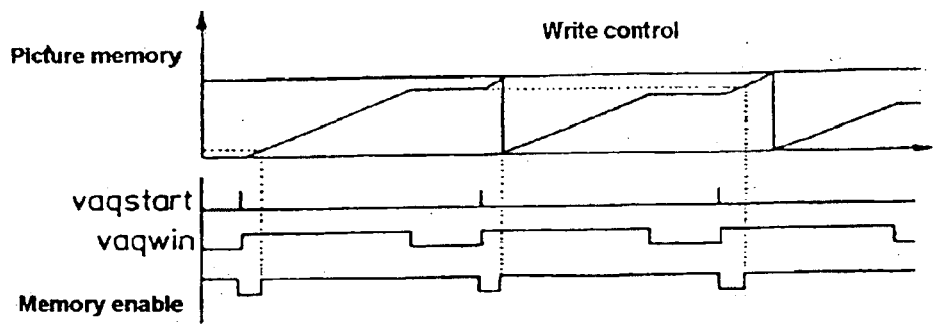
FIG. 5 shows a diagram of the signal profiles according to the invention.
Figure 5B:
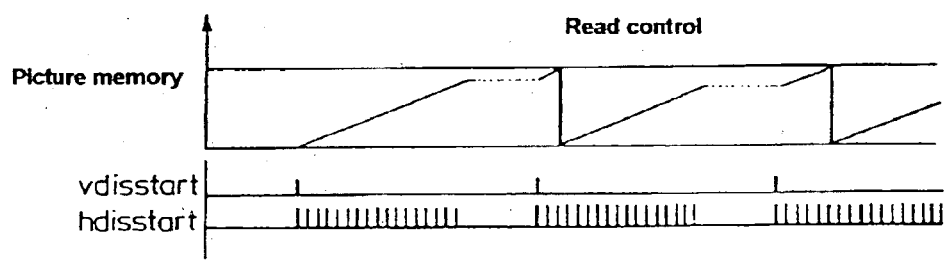

FIG. 5 shows the corresponding signal profiles during write control (a) and read control (b). Accordingly, there is thus always somewhat more than one inset field in the memory. In a similar manner to the case of the organization of two field memories, in this case, too, the write address pointer determines the memory segment enable. The signals "vaqstart", "vaqwin", "vdisstart" and "hdisstart" again have the same meaning as in FIGS. 2 and 3.

Figure 6:
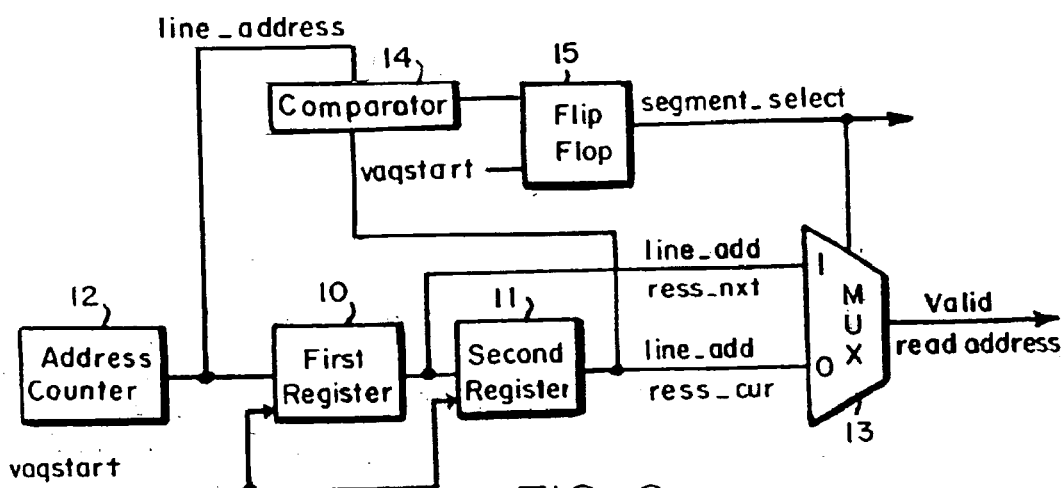
FIG. 6 shows a block diagram of a circuit arrangement for selecting a memory segment.

FIG. 6 shows a block diagram for selecting the respectively valid memory segment. The circuit comprises an address counter 12, whose output is connected to a first register 10 and to a first input of a comparator 14, a second register 11, to whose input the output of the first register 10 is connected, and also a multiplexer 13, whose first input (line_adr_next) is connected to the output of the first register 10 and whose second output is connected to the output of the second register 11. This latter output is also connected to a second input of the comparator 14, whose output is connected to a flip-flop 15.

For control of the read accesses, the start addresses of the old and new inset fields are stored in the registers 10, 11.

With the beginning of a new field, the older of the two register contents is rejected, and the formerly new start address becomes the old address, while the present current address becomes the new start address. If the beginning of the older inset field has been overwritten as a result of the memory being written to in a circulating-manner, it can no longer be read.

For selection of the valid memory segment, the content of the address counter 12 (line_address) is continually compared with the start address of the older of the two fields (line_address_cur) in the comparator 14. In the event of correspondence, the flip-flop 15 is set and the start address of the new field is then present at the output of the multiplexer 13. If a new field is begun, then the flip-flop is reset, and, as a result of the change of the register contents, the same start address as before is present at the output of the multiplexer 13, until this is also overwritten again. In this way, the memory enable points to a valid memory segment at every instant. The memory space that is additionally present means that the read pointer cannot reach or overtake the write pointer even in the event of a jump on account of the raster position correction.

In order to satisfy the general requirements, however, this sequence must be extended. Considerable deviations from the standard can occur particularly in the case of video recorders which are operated with fast forward or rewind with picture reproduction. In this case, by way of example, it is also necessary to take account of the maintenance state and the wear of the tape material. The memory control must be able to compensate for the effects of a stretched tape and also synchronism fluctuations of the drive mechanism. However, a precondition in this case is that the sync pulse separation still operates correctly in the case of such a signal.

The vertical frequency $f_V$ and the horizontal frequency $f_H$ are related through the number Z of lines as follows:

$$f_V = f_H / Z \quad (5.1)$$

The line frequencies of the main picture ($f_{Hp}$) and of the inset picture ($f_{Hi}$) are of interest for the algorithm. Their fluctuations directly affect the writing and reading speed. The larger the line frequency $f_{Hi}$ of the inset picture, the more memory content is written per unit time. The smaller the line frequency $f_{Hp}$ of the main picture, the fewer lines are read per unit time. The opposite correspondingly holds true.

If the same standard is used in both sources, then the following relationships hold true, where $f_H$ is the desired line frequency:

$$f_{Hi\_max} = f_H(1 + df_{Hi}) \quad (5.2)$$

$$f_{Hi\_min} = f_H(1 + df_{Hi}) \quad (5.3)$$

$$f_{Hp\_max} = f_H(1 + df_{Hp}) \quad (5.4)$$

$$f_{Hp\_min} = f_H(1 + df_{Hp}) \quad (5.5)$$

It will additionally be assumed that no vertical picture decimation is performed. Since the sources are again two sources that are asynchronous with respect to one another, write and read pointers can adopt any desired position with respect to one another. Equally, the pointers can overtake one another in both directions given corresponding combination of the horizontal frequencies.

Figure 7:
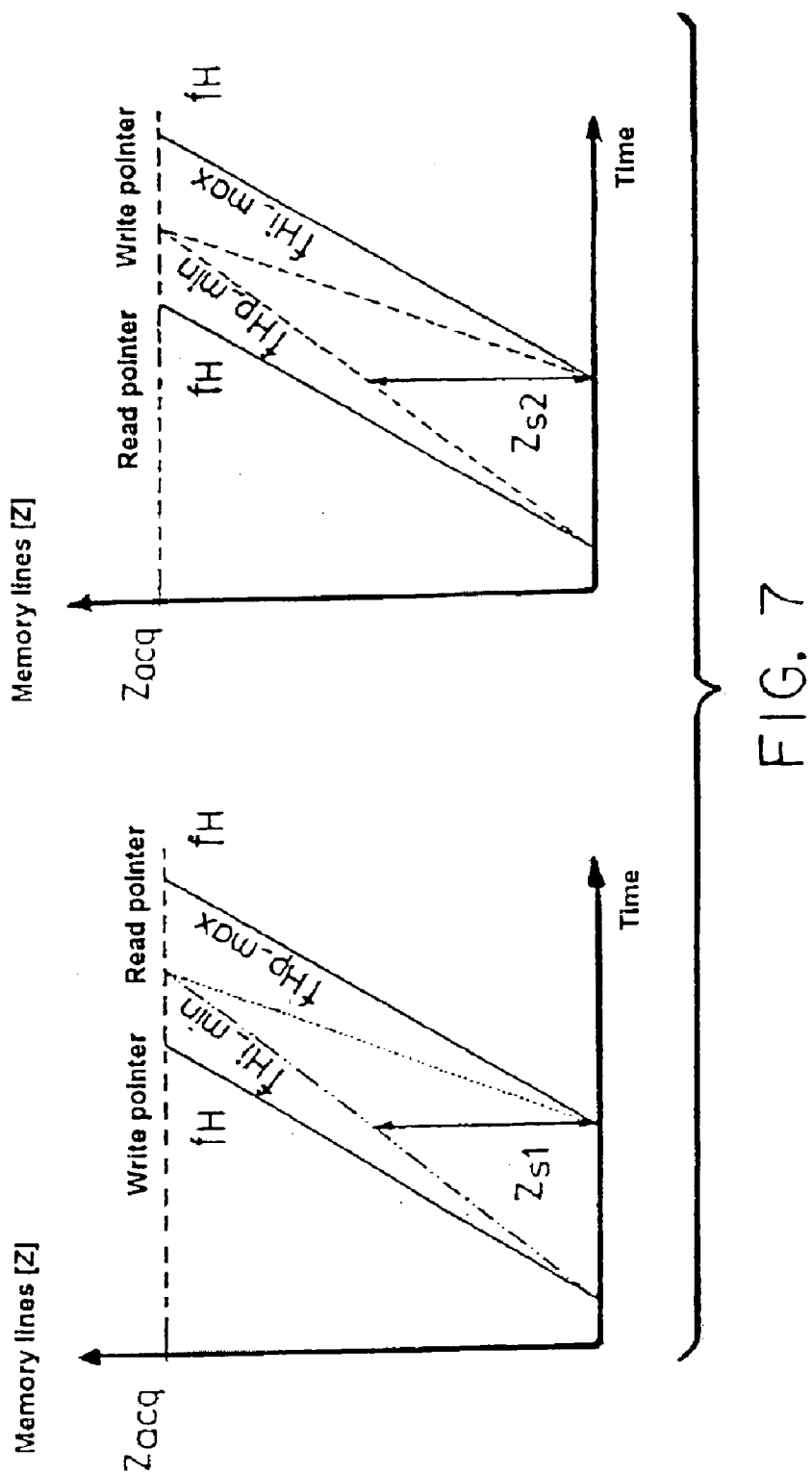
FIG. 7 shows an address pointer representation in the absence of vertical decimation.

FIG. 7 shows the memory lines required for the respective write and read pointers, where $Z_{acq}$ is the number of picture lines of a field that are used for acquisition. The representation makes it clear how many lines must additionally be present in the memory in order to prevent overtaking of the pointers in both directions.

$$Z_{s2}=Z_{acq}\{(f_{Hi\_max}-f_{Hp\_min})/f_{Hi\_max}\} \quad (5.6)$$

$$Z_{s1}=Z_{acq}\{(f_{Hp\_max}-f_{Hi\_min})/f_{Hp\_max}\} \quad (5.7)$$

The total amount of additionally required memory for the seamless picture-in-picture representation turns out to be:

$$Z_g=Z_{acq}+Z_{s1}+Z_{s2} \quad (5.8)$$

During writing, the memory contains part of an old field and part of a new field. Through the position of the write address pointer, one of the two fields is enabled for reading. If fewer than $Z_{s1}$ lines of the new field have been written, the old field is enabled. Otherwise, the distance from the beginning of the old field is less than $Z_{s2}$ lines, with the result that the new field can be read.

Figure 8:
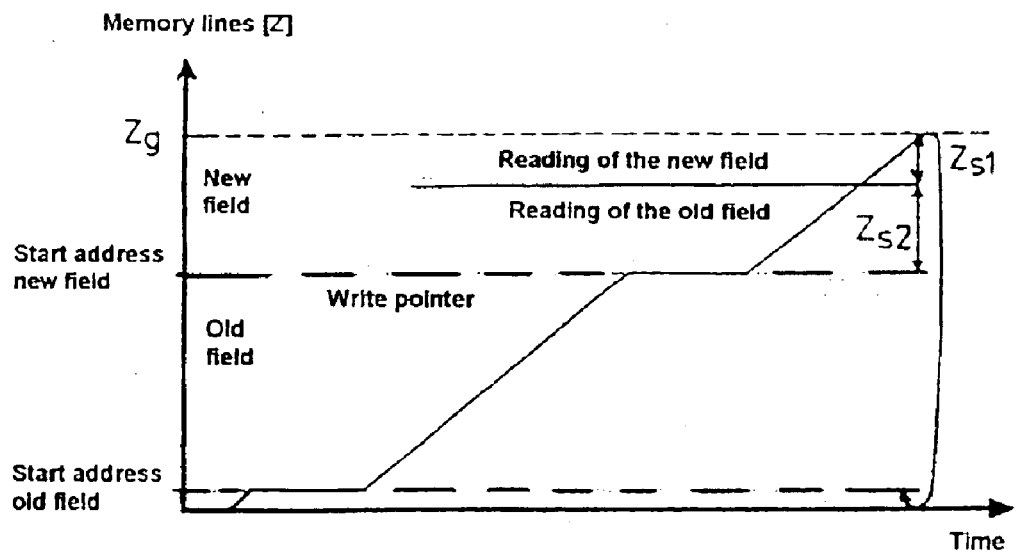
FIG. 8 shows a representation of memory division in the absence of vertical decimation.

FIG. 8 shows the memory division in the case where no vertical decimation is performed.

Figure 9:
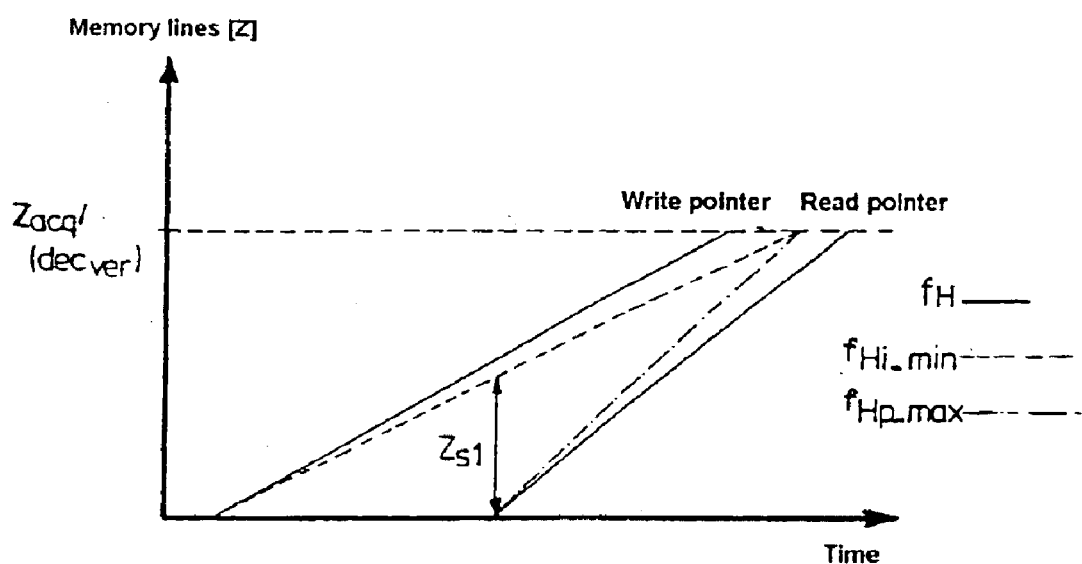
FIG. 9 shows a representation of the memory outlay in the case of decimation.

If decimation is then effected in the horizontal and vertical direction, this influences the speed of the write address pointer. The corresponding relationships are shown in FIG. 9. The rise of the ramp is smaller in this figure.

It will initially be assumed that the writing speed changes to a considerable extent as a result of the decimation. By contrast, the fluctuations due to changes in the line frequency shall be small.

It follows from this that the read pointer can no longer be overtaken by the write pointer on account of the speed difference. As a result, the memory outlay for seamless picture-in-picture representation can now be determined using the decimation factors and the fluctuation range of the picture sources.

$$Z_{s1\_dec}(dec_{ver})=(Z_{acq}/dec_{ver})(1-f_{Hi\_min}dec_{ver}/f_{Hp\_max}) \quad (5.9)$$

The additional requirement of lines decreases as the decimation factor increases. The maximum emerges for a vertical decimation factor $dec_{ver}$ of 1 (vertically undecimated picture).

The possibility of the read pointer being overtaken by the write pointer will now also be taken into account. For small vertical decimation factors, the result is a further additional memory requirement of:

$$Z_{s2\_dec}=(Z_{acq}/dec_{ver})(1-f_{Hp\_min}dec_{ver}/f_{Hi\_max}) \quad (5.10)$$

For a meaningful result, the expression in the right-hand brackets must be positive. The validity of this expression is thus limited to a range of:

"1" less than equal to "$dec_{ver}$" less than equal to "$(f_{Hi\_max}/f_{Hp\_min})$" (5.11)

For values which are greater than the right-hand limit, $Z_{s2\_dec}$ shall be set to zero.

Taking account of the validity ranges, the additional memory requirement results from the sum of $Z_{s1\_dec}$ and $Z_{s2\_dec}$. The examinations made at the beginning are a special case for a vertical decimation factor of 1.

The total memory requirement consequently turns out to be:

$$Z_g(dec_{ver})=Z_{acq}/dec_{ver}+Z_{s1\_dec}+Z_{s2\_dec} \text{ for "1" less than equal to "}dec_{ver}\text{" less than equal to "}f_{Hi\_max}/f_{Hp\_min}\text{"} \quad (5.12)$$

thus resulting in the following:

$$Z_g(dec_{ver})=Z_{acq}/dec_{ver}(3-f_{Hp\_min}dec_{ver}/f_{Hi\_max}-f_{Hi\_min}/(dec_{ver}f_{Hp\_max}) \quad (5.14)$$

Otherwise, the following holds true:

$$Z_g(dec_{ver})=Z_{acq}/dec_{ver}+Z_{s1\_dec} \text{ for "}dec_{ver}\text{" greater than "}(f_{Hi\_max}/f_{Hp\_min})\text{"} \quad (5.13)$$

The following results from this:

$$Z_g(dec_{ver})=Z_{acq}/dec_{ver}(2-f_{Hi\_min}/(dec_{ver}f_{Hp\_max}) \quad (5.15)$$

The total number of memory cells required has its maximum for a vertical decimation factor of 1. As the decimation factor increases, the memory cell requirement greatly decreases.

It shall also supplementarily be pointed out that when the memory 2 is extended to three segments, the method according to the invention can also be employed with a frame frequency of 100 Hz in the AABB raster.

What is claimed is:

1. A method for picture-in-picture insertion, in which a sequence of decimated inset pictures is written to a memory device and is read out for insertion into a sequence of main pictures, the method comprising the steps of:

writing inset pictures to the memory device in a circulating manner as fields under continuously incremented write addresses, the inset pictures being written to corresponding memory segments beginning at corresponding writing start addresses, storing the writing start address of each written-in field, each time the write address is incremented, by comparison of the respective instantaneous write address with a previously stored writing start address, an overtake signal, which indicates whether the respective writing start address is reached again and the memory segment corresponding to the respective writing start address is overwritten, by evaluation of the overtake signal, selecting for read out the memory segment corresponding to the last writing start address stored or the penultimate writing start address stored, and reading out the selected memory segment for insertion into the respective main picture with continuously incremented read addresses.

2. The method of claim 1 further comprising continuously incrementing the write and read addresses from a first memory address up to a last memory address and are in each case resetting the write and read addresses to the first memory address again after the last memory address has been reached.

3. The method of claim 1 further comprising, in order to insert an inset picture into a main picture, in each case storing the picture position and size are in the form of a number of lines and also pixels per line in a segment buffer for two inset pictures.

4. The method of claim 1 further comprising effecting the raster correction by comparison between the raster position of a picture to be displayed and the raster position of a stored picture and also by skipping or repeating a line.

5. The method of claim 1 further comprising, each time the write address is incremented, comparing the instantaneous write address with the penultimate writing start address stored wherein, in the event of correspondence, the last writing start address stored is used as reading start address for reading the corresponding memory segment, whereas otherwise the penultimate writing start address is used as reading start address for reading the corresponding memory segment.

6. A circuit arrangement for inserting a sequence of decimated inset pictures into a sequence of main pictures, comprising:

a write controller for writing the inset pictures as fields under continuously incremented write addresses to corresponding memory segments of a memory device beginning at corresponding writing start addresses, having a segment buffer for storing the writing start address of each field written to the memory device, in which case an overtake signal can be generated by the write controller each time the write address is incremented, by comparing the respective instantaneous write address with a previously stored writing start address, which overtake signal indicates whether the respective writing start address is reached again and the memory segment of the memory device which corresponds to the respective writing start address is overwritten, having a display controller to which the overtake signal is fed, in which case the display controller can select, by evaluating the overtake signal, the memory segment corresponding to the last writing start address stored or the penultimate writing start address stored, for read-out by a read controller, connected to the segment buffer, with the aid of continuously incremented read addresses and for insertion into the respective main picture.

7. The circuit arrangement of claim 6 wherein the write controller and the read controller each have an address counter for incrementing the write addresses and read addresses, respectively.

8. The circuit arrangement of claim 6 wherein, by means of the display controller, an insertion position of an inset picture is calculated and a corresponding insertion signal can be fed to an insertion apparatus.

9. The circuit arrangement of claim 6 wherein, by means of the display controller, raster correction can be carried out by comparison between the raster position of a picture to be displayed and the raster position of a stored picture and also by skipping or repeating a line.

10. A circuit arrangement of claim 6 wherein provision is made of a comparator for comparing the instantaneous write address provided by an address counter with the penultimate writing start address stored, the output of the comparator being connected to a flip-slop for driving a multiplexer, and in that the penultimate writing start address stored is present at a first input of the multiplexer and the last writing start address stored is present at a second input of the multiplexer, with the result that, in the event of correspondence between the instantaneous write address of the address counter and the penultimate writing start address stored, the multiplexer outputs the last writing start address stored as reading start address, whereas otherwise the multiplexer outputs the penultimate writing start address stored as reading start address.

* * * * *